(12) United States Patent
Dingemans et al.

(10) Patent No.: US 9,593,822 B2
(45) Date of Patent: Mar. 14, 2017

(54) LIGHT-SHAPING OPTICAL ELEMENT

(71) Applicant: PHILIPS LIGHTING HOLDING B.V., Eindhoven (NL)

(72) Inventors: Antonius Petrus Marinus Dingemans, Eindhoven (NL); Michel Cornelis Josephus Marie Vissenberg, Eindhoven (NL); Erik Paul Boonekamp, Eindhoven (NL); Willem Franke Pasveer, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 146 days.

(21) Appl. No.: 14/356,269

(22) PCT Filed: Oct. 23, 2012

(86) PCT No.: PCT/IB2012/055812
§ 371 (c)(1),
(2) Date: May 5, 2014

(87) PCT Pub. No.: WO2013/068865
PCT Pub. Date: May 16, 2013

(65) Prior Publication Data
US 2015/0292707 A1    Oct. 15, 2015

Related U.S. Application Data

(60) Provisional application No. 61/556,903, filed on Nov. 8, 2011.

(51) Int. Cl.
*F21V 5/00* (2015.01)
*G02B 3/00* (2006.01)

(52) U.S. Cl.
CPC ............. *F21V 5/002* (2013.01); *F21V 5/003* (2013.01); *F21V 5/004* (2013.01); *F21V 5/005* (2013.01); *G02B 3/0062* (2013.01)

(58) Field of Classification Search
CPC .......... F21V 5/002; F21V 5/003; F21V 5/004; F21V 5/005; G02B 3/0062
USPC ............................................. 362/311.02, 355
See application file for complete search history.

(56) References Cited

U.S. PATENT DOCUMENTS

| 3,621,233 | A | * | 11/1971 | Ferdinand, Jr. | ....... F21S 48/145 362/355 |
| 7,862,223 | B2 | | 1/2011 | Hsu | |
| 2007/0268585 | A1 | | 11/2007 | Santoro | |
| 2009/0059575 | A1 | * | 3/2009 | Crow | ....... F21K 2/06 362/191 |

(Continued)

FOREIGN PATENT DOCUMENTS

| EP | 2180232 A1 | 4/2010 |
| JP | 19902046401 A | 2/1990 |

(Continued)

*Primary Examiner* — Laura Tso

(57) ABSTRACT

The present invention relates to a light-emitting arrangement (20) comprising a light source (22) and a scattering member (24). The scattering member (24) is arranged in a three-dimensional shape in front of the light source (22) in a light output direction. Different regions of the scattering member have different optical characteristics to provide a desired total light output in respect of brightness level, scattering function and beam shape.

11 Claims, 5 Drawing Sheets

(56) References Cited

U.S. PATENT DOCUMENTS

| | | | |
|---|---|---|---|
| 2009/0067151 A1 | 3/2009 | Sahlin | |
| 2010/0128487 A1* | 5/2010 | Lin | F21V 5/04 362/311.02 |
| 2010/0246173 A1 | 9/2010 | Wei | |
| 2010/0290234 A1* | 11/2010 | Bierhuizen | F21V 5/04 362/311.02 |
| 2013/0128577 A1* | 5/2013 | Wang He | F21V 5/002 362/237 |

FOREIGN PATENT DOCUMENTS

| | | |
|---|---|---|
| JP | 20033167103 A | 6/2003 |
| JP | 2004152764 A | 5/2004 |
| JP | 2009168961 A | 7/2009 |
| JP | 2010113975 A | 5/2010 |
| JP | 2011059698 A | 3/2011 |
| JP | 2011150077 A | 8/2011 |

* cited by examiner

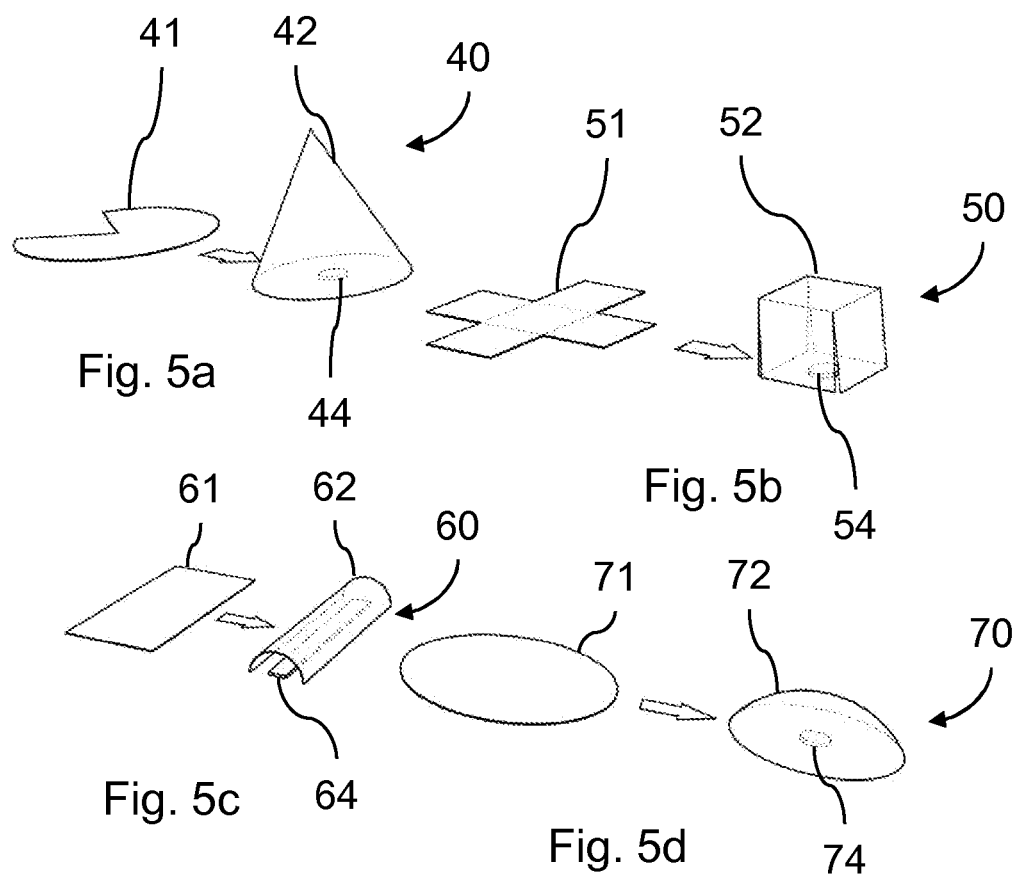

LIGHT-SHAPING OPTICAL ELEMENT

CROSS-REFERENCE TO PRIOR APPLICATIONS

This application is the U.S. National Phase application under 35 U.S.C. §371 of International Application No. PCT/IB2012/055812, filed on Oct. 23, 2012, which claims the benefit of U.S. Provisional Patent Application No. 61/556,903, filed on Nov. 8, 2011. These applications are hereby incorporated by reference herein.

FIELD OF THE INVENTION

The present invention relates to an optical element, and especially to an optical element comprising a scattering member with scattering and beam shaping abilities.

BACKGROUND OF THE INVENTION

In optical design for indoor lighting products light source brightness and the shaping of the light beam need to be considered. A too high brightness in the lighting product is not desired. It may cause an uneven light distribution from the lighting product which may provide scattering and beam shaping problems. A common lighting product (1) according to prior art is shown in FIG. 1 comprising a light source (2) and a scattering sheet (4) arranged on a distance (6) from the light source. A solid angle (8) represents the angle of the light from the light source covered by the scattering sheet.

Commonly in indoor lighting products there is a tradeoff between the light source brightness and the beam shaping ability of the lighting product. With high light source brightness, there may be problems in shaping the beam in a desired way. Further, low light source brightness may affect the effectiveness of the lighting product.

One way of solving the problems of reaching a suitable brightness level in accordance to the beam shaping in the lighting product is to first lower the brightness of the light from a light source, e.g. by adding a diffusing or scattering member arranged close to the light source. Subsequently is the light beam shaped, e.g. by a large reflector or white cup.

One example of such solution is disclosed in JP2010113975 wherein a diffusion sheet is arranged above a plurality of light emitters. To shape the light beam a light beam shaper needs to be added, such as a reflector.

In an alternative way, the light beam is first shaped, e.g. by TIR (Total Internal Reflection) collimators or a small reflector, and subsequently the light brightness is reduced, e.g. by introducing a limited diffusive exit window for the light beam.

Further, there is a need to accomplish a minimal physical size of lighting products. As seen in FIG. 1b, a scattering sheet (4) may be arranged at a smaller distance (6') to the light source (2), thereby both providing a larger solid angle (8') and a smaller product. However, there is a limit to how small a lighting product with a reflector and a scattering sheet may be since there is a limit to how close a scattering sheet may be arranged to a light source without exceeding a maximum brightness. Such arrangement may cause a too high brightness level in a central portion of the scattering sheet, and a significantly lower brightness level in edge portions of the scattering sheet. This may cause an uneven light distribution that negatively affects the beam shaping abilities of the lighting product.

Consequently, there is a need for an alternative solution for a lighting product of smaller size, which combines moderated brightness with beam shaping ability.

SUMMARY OF THE INVENTION

It is an object of the present invention to overcome this problem, and to provide a light-emitting arrangement of small size and with scattering and beam shaping function.

According to a first aspect of the invention, this and other objects are achieved by a light-emitting arrangement comprising a light source and a scattering member. The scattering member is arranged in a three-dimensional shape in front of the light source in a light output direction. Different regions of the scattering member have different optical characteristics.

A scattering member arranged in a three-dimensional shape in front of the light source in combination with the different optical characteristics of different regions of the scattering member may provide a brightness lowering function, a light scattering function as well as a light beam shaping function. By arranging the scattering member in front of the light source a large solid angle of the light source may be covered by the scattering member. Further, a minimal distance between the light source and the scattering member may be maintained. This means that the optical component may catch a maximum of light arrays from the light source at a distance that may be sufficient to not exceed intended maximum brightness levels for the optical component. This may be for avoiding glare issues with the light-emitting arrangement. All light caught by the scattering member is scattered over the area of the scattering member to lower the brightness of the light from the light source. This may further provide that the light-emitting arrangement gets a smaller size compared to prior art. The scattering member may be arranged close to the light source without the risk of brightness problems due to the three-dimensional shape of the scattering member.

By "in front of", is meant in front of the light source in a light distribution direction, or between the light source and an intended viewer of the light-emitting arrangement.

By designing different regions of the scattering member to have different optical characteristics, the total optical property and light emitting property, including the shape of the light beam, of the optical component may be optimized for a certain purpose. Such optimization may be performed to maximize the forward scattering of the scattering member and minimize the backscattering of the scattering member. The total light distribution may be designed, i.e. the light beam from the light source may be shaped. The light-emitting arrangement according to the invention may have an advantage to be easily customizable. By only replacing the scattering member, the total light distribution of the light-emitting arrangement may be changed. Different applications may require different brightness levels and different beam shapes. The present invention may provide a cost effective solution for providing the possibility of providing optical components for a large variety of designs. Such light-emitting arrangements may be suitable for both consumer applications and in professional lighting applications.

Since all required optical elements, both for scattering and beam shaping, are integrated in the light-emitting arrangement, it may be suitable for modular product architectures. The three-dimensional shape of the scattering member may be a cone shape, a box shape, a cylinder shape, a sphere shape, a dome shape or the like.

In one embodiment, different regions of a surface of the scattering member may have different optical characteristics.

By providing different regions of a surface of the scattering member with different optical characteristics, the total light distribution from the light-emitting arrangement may be controlled. The light beam from the light-emitting arrangement may be shaped in a particular way by designing the optical characteristics of different regions in the surface of the scattering member accordingly. By designing the surface of the scattering member, such scattering member may be easy to manufacture.

In another embodiment, the different optical characteristics of the different regions of the scattering members may be different optical structures.

By providing the scattering member with different optical structure in different regions of the member, the light from the light source may be shaped in a desired way at the same time as the light is scattered to set a desired light brightness output from the optical member. The different optical structures may for instance comprise differences in the surface of the scattering member, differences in the material composition in the scattering member or differences in thickness of the scattering member. The different optical structures may further be differences in properties of a surface structure. The different optical structures may further be different geometries in a surface of the scattering member. The different optical structures may be different geometrical optical structures. Alternatively, the different optical characteristics may be provided by particles or pores in a surface of the scattering member.

In a further embodiment, a surface of the scattering member may comprise at least one optical structure selected from among the group of ripple structure, refractive structure, lens array structure, and combinations thereof.

By designing the optical structure of different regions of the scattering member, the function of the scattering member in different regions may be controlled and designed in an effective manner. This allows further possibilities in designing the scattering and beam shaping function of the different regions of the scattering member, contributing to the total light distribution of the light-emitting arrangement. The scattering member may further comprise regions with a combination of different types of structure. Such region may be a transition region between two regions with different structure, providing a gradient region going from one structure to another. The different regions of the scattering member may thereby have floating limits between each other. The optical structure of a region may be any structure that has a scattering function. The optical structure may be selected from among the group of ripple, refractive or lens array structure. Different regions having different optical structure selected among said group may be provided as different regions having the same optical structure type but with different properties.

In another embodiment, two opposite facing surfaces of the scattering member each may comprise an optical structure selected from among the group of ripple structure, refractive structure, lens array structure, and combinations thereof.

The scattering member may be made of a scattering sheet that is arranged in a three-dimensional shape. The two opposite facing surfaces may then be the two sides of the scattering sheet. By providing different optical structure in different regions of both surfaces of the scattering member, the behavior of the different regions of the scattering member may be designed with less complicated structure designs on each side, since the two sides will cooperate to the total optical behavior of that region. A specific region of the scattering member may on the two opposite surfaces be provided with a similar type optical structure. Alternatively, a region may comprise two opposite surface provided with different types of optical structure, for instance a ripple structure on one side and a refractive structure on the other side. The optical structures of the two surfaces may be asymmetric or symmetric.

In one embodiment, the refractive structure may include total internal refraction facets.

By including total internal refraction facets in the refractive structure on a surface of the scattering member, the scattering member may be designed to further minimize the backscattering of the scattering member. The design of the facets may be selected based on the facet's position relative to the light source.

In one embodiment, the optical characteristics of each different region of the scattering member may be selected depending on an angle between a direction perpendicular to a surface of each region and a direction from the same region towards the light source.

By designing the optical characteristics or optical structure of a certain region based on an angle from the region to the light source compared to a direction perpendicular to the surface of that region, the backscattering in that region may be minimized. Further, such region may be optimized regarding refraction to provide a desired light beam shape for that region.

In one embodiment, the optical characteristics of different regions of the scattering member may be selected depending on the relative distances of said regions of the scattering member to the light source.

The relative distance between a certain region and the light source may affect light intensity that reaches that region. The design of the optical characteristics of that region may thereby be affected by said relative distance. To achieve a desired total light distribution from the light-emitting arrangement, each region may need to be designed with aspect to said distance. As an example, an optical structure of a certain type and/or with certain properties may be chosen for each region depending on said distance.

In one embodiment, the optical structures has a depth of about 5-50 μm.

The depth may be different for different regions of the scattering member. Different regions of the scattering member may be provided with the same type of optical structure, but with different structure depth. By structure depth it may be meant a distance between a top and a bottom in a relief structure in a surface of the scattering member.

In one embodiment, the scattering member may be a scattering sheet that is bent or folded into a three-dimensional shape.

The scattering member may be a two-dimensional scattering sheet that has been bent or folded into a three-dimensional shape. This may provide a light-emitting arrangement and a scattering member that is cost-effective to manufacture. It may further be easy to manufacture compared to a solid three-dimensional scattering member.

In a further embodiment, the scattering sheet may comprise a top surface and a bottom surface provided with different regions having different optical characteristics.

Depending on the three-dimensional shape of the scattering member, the scattering sheet forming the three-dimensional scattering member may be designed in a certain way. The optical characteristics of the different regions may be selected depending on each region's position in the three-dimensional scattering member. The two surfaces may thereby be provided with different optical characteristics in different regions before the scattering sheet is arranged in a three-dimensional shape.

In one embodiment, the scattering member may be arranged in a three-dimensional shape such that light from the light source is redirected by the scattering member into at least two different directions.

A three-dimensional shape of the scattering member may provide that light from the light source is directed into different directions. The light beam from the light-emitting arrangement may thereby be designed in a desired way. Light may be directed into a plurality of directions from the same light-emitting arrangement using a single scattering member.

According to a second aspect of the invention, a method for manufacturing a light-emitting arrangement is provided. The method comprises the steps of manufacturing a scattering sheet, wherein different regions of the scattering sheet have different optical characteristics, and arranging the scattering sheet in a three-dimensional shape in front of a light source in a light output direction.

The scattering sheet may be manufactured as a two-dimensional sheet with different optical structures in different two-dimensional regions of the sheet. This provides for a cost-effective manufacturing method for the scattering sheet and the light-emitting arrangement. The scattering sheet may then be arranged in a three-dimensional shape in front of a light source. The scattering member may be arranged in a cone shape, a box shape, a cylinder shape, a sphere shape, a dome shape or the like. All features described herein for a light-emitting arrangement according to the invention may be applied to a light-emitting arrangement manufactured according to said method.

In a further aspect, the invention relates to a luminaire comprising a light-emitting arrangement as described herein.

It is noted that the invention relates to all possible combinations of features recited in the claims.

BRIEF DESCRIPTION OF THE DRAWINGS

The various aspects of the invention, including its particular features and advantages, will be readily understood from the following detailed description and the accompanying drawings, in which:

FIG. 5 a-d illustrates scattering members according to embodiments of the present invention.

DETAILED DESCRIPTION OF THE EMBODIMENTS

Figure 1A:
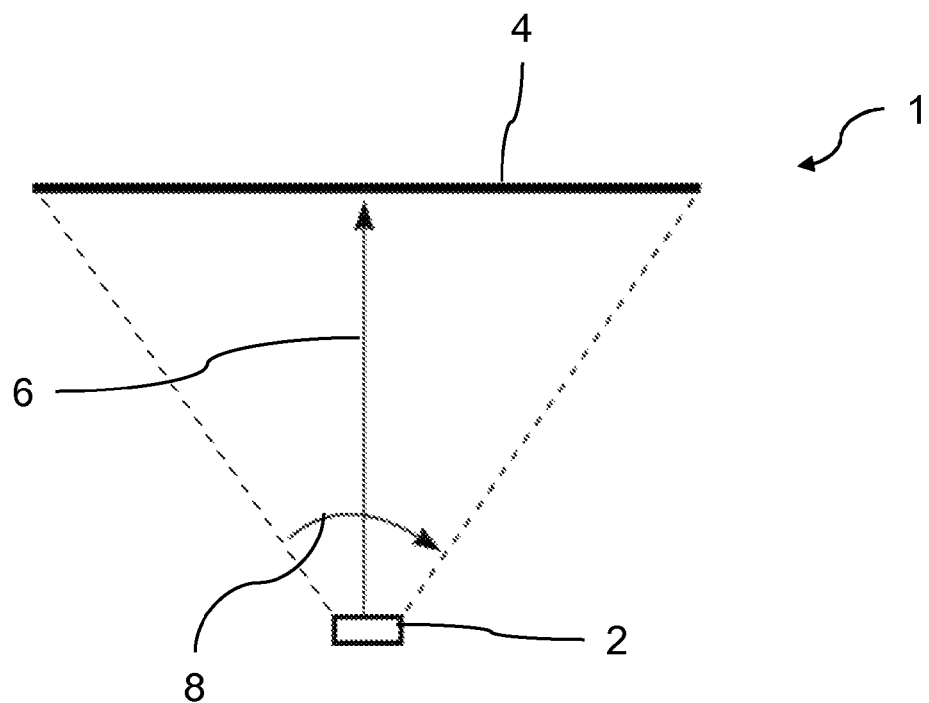
FIGS. 1a and b illustrates a light-emitting arrangement according to known technology.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1a illustrates a light-emitting arrangement 1 according to prior art. The light-emitting arrangement 1 comprises a light source 2 and a scattering sheet 4. The scattering sheet 4 is arranged at a distance 6 from the light source 2. The distance 6 between the scattering sheet 4 and the light source 2, and the size of the scattering sheet 4 provides a solid angle 8 for the light-emitting arrangement 1. The solid angle 8 is a way of determining how much of the light from the light source 2 that is utilized in the light-emitting arrangement 1 by being scattered by the scattering sheet 4.

Figure 1B:
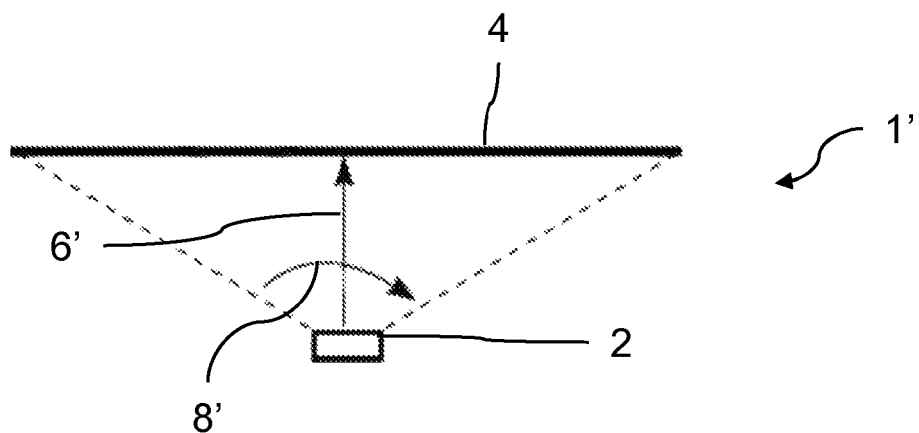

There is a need for providing smaller optical arrangements such as a light-emitting arrangement 1 in FIG. 1a. To make the light-emitting arrangement 1 in FIG. 1a smaller, light-emitting arrangement 1' as in FIG. 1b is provided in prior art. This light-emitting arrangement 1' has a smaller distance 6' between the scattering sheet 4 and the light source 2, providing a larger solid angle 8'. A larger amount of the light from the light source 2 is thereby utilized in the light-emitting arrangement 1'. However, there is a limit to how close the scattering sheet 4 may be arranged to the light source 2 without exceeding a maximum brightness level.

Turning now to the present invention, FIG. 2 illustrates a light-emitting arrangement 20 according to an embodiment. The light-emitting arrangement 20 comprises a light source 22 and a scattering member 24. A central region 27b of the scattering member 24 is arranged at a distance 16 from the light source 22. Light from the light source 22 is extending in a light output direction A from the light source 22 towards the scattering member 24. The scattering member 24 is arranged in a three-dimensional shape in front of the light source 22 in the light output direction A. This provides for a larger solid angle 18 compared to prior art, without exceeding a maximum brightness level.

Figure 2A:
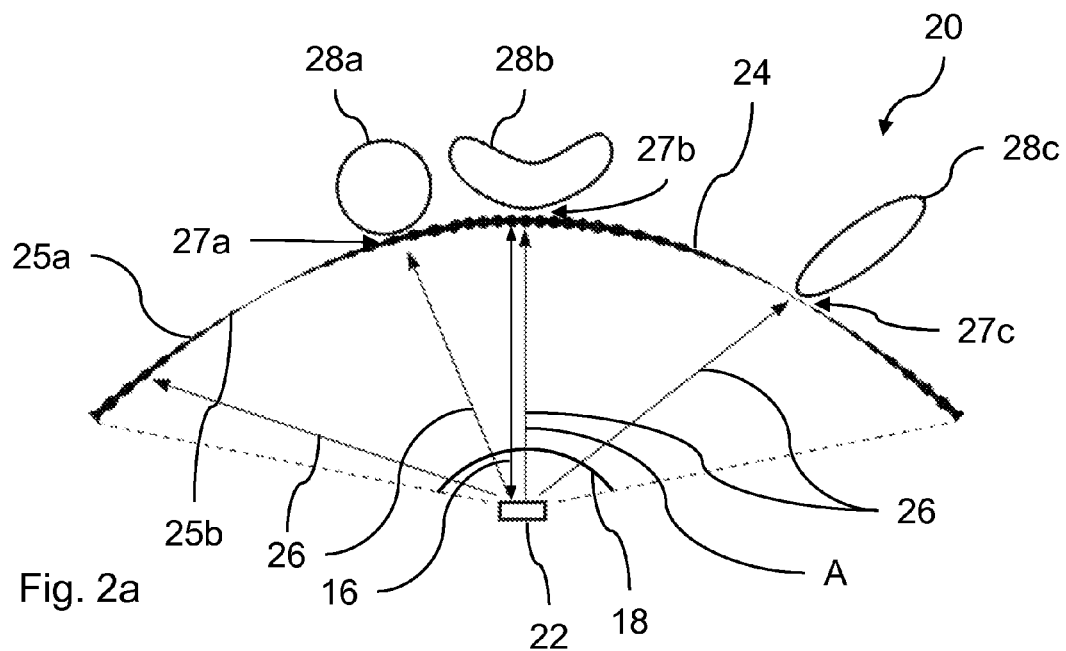
FIG. 2a illustrates a light-emitting arrangement according to an embodiment of the present invention.
Figure 2B:
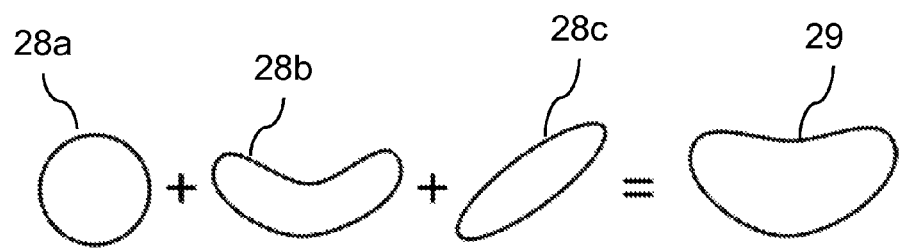
FIG. 2b illustrates different light shapes providing a total light output according to an embodiment of the invention.

As seen in FIG. 2a, the light source 22 emits light 26 towards the scattering member 24. The scattering member 24 has different regions 27a-c provided with different optical characteristics. In the embodiment according to FIG. 2a, the optical characteristics are provided as optical structures in a top 25a and/or bottom 25b surface of the scattering member 24. The different regions 27a-c with different optical structures provide that light from the light source 22 is scattered differently in different regions 27a-c of the scattering member 24. Output light from the light-emitting arrangement 20 is provided in different shapes 28a-c in different regions of the scattering member 24. As shown in FIG. 2b, the different shapes 28a-c of the different regions are designed to provide a desired total light output 29 from the light-emitting arrangement 20.

Figure 2C:
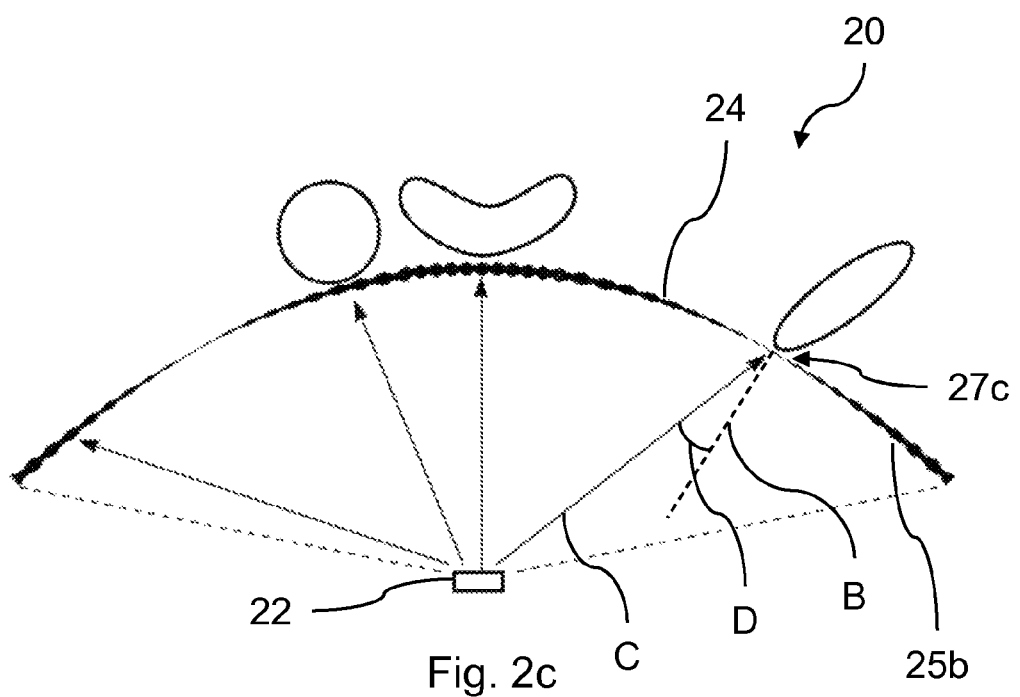
FIG. 2c illustrates a light-emitting arrangement according to an embodiment of the present invention.

The selection of optical characteristics for a certain region 27c of the scattering member 24 may depend on the position of that region 27c relative to the light source 22. As seen in FIG. 2c, the position may be determined by an angle D between a direction B perpendicular to a surface 25b of the region 27c and a direction C from the light source towards the region 27c. This angle D may also be described as an angle of incidence for the light 26 from the light source 22 to the scattering member 24. The selection of optical characteristics for the region 27c may further be selected depending on the distance between the region 27c and the light source 22.

Figure 3:
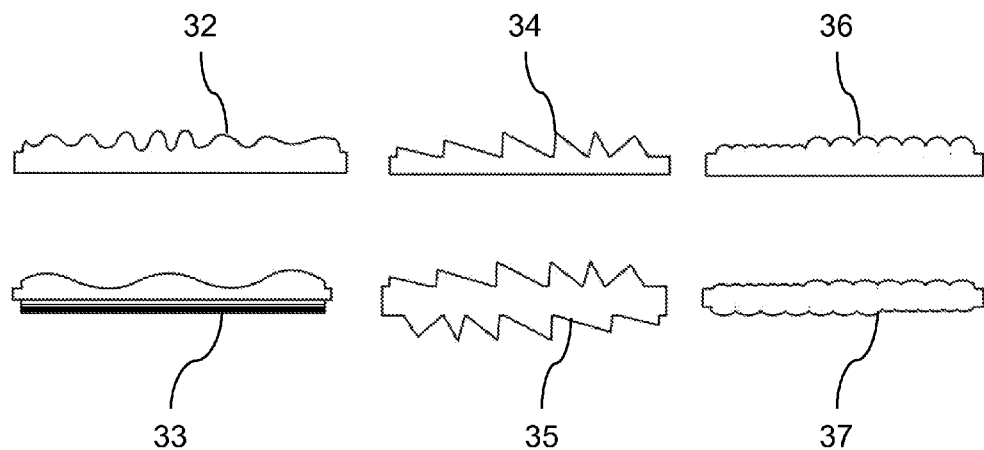
FIG. 3 illustrates optical structures for scattering member surfaces according to an embodiment of the present invention.

As illustrated in FIG. 3, the surface or surfaces 25 of the scattering member 24 may comprise different types of optical structure to provide different scattering properties in different regions 27a-c of the scattering member 24. The scattering member 24 may be provided with a single sided ripple structure 32, a double sided ripple structure 33 wherein the ripple structure on the top surface may be arranged in a perpendicular manner compared to the structure on the bottom surface, a single sided refractive structure 34, a double sided refractive structure 35, a single sided lens array structure 36 or a double sided lens array structure 37. Any double sided structure arrangement may be provided by one side structure being arranged in a perpendicular manner compared to the other side structure. One or several of these structures may be provided in the same scattering member 24. Different types and different sizes of structures may be provided in different regions of the scattering member 24. The different types of optical structures 32-37 provide different scattering function. The optical structure for a certain region 27a-c is selected to optimize the scattering function and the beam shaping function for that specific region. This is done to optimize the light output as well as reduce the backscattering in the light-emitting arrangement.

Figure 4:
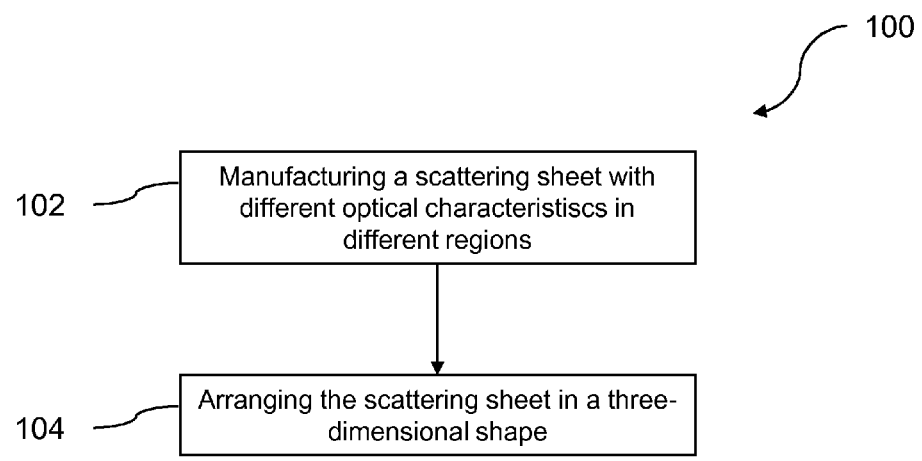
FIG. 4 shows a flow chart of a method according to an embodiment of the present invention.

FIG. 4 illustrates a method 100 according to an embodiment. The method 100 comprises a step 102 of manufacturing a scattering sheet with different optical characteristics in different regions of the scattering sheet. The scattering sheet is thereby manufactured as a two-dimensional sheet. The optical characteristics may be an optical structure on at least one surface of the scattering sheet, and such optical structure may be embossed or milled in the sheet material. Alternatively, the optical structure may be added to a scattering sheet material as an attached layer or film.

In a further step 104, the scattering sheet is arranged in a three-dimensional shape in front of a light source. A light-emitting arrangement is thereby manufactured comprising a three-dimensionally arranged scattering member in front of a light source, wherein the scattering member comprises different optical characteristics in different regions of the member.

Such method 100 and arrangement 20 as described above, is further illustrated in FIG. 5a-d, wherein two-dimensional scattering members 40, 50, 60, 70 in the form of sheets are arranged in three-dimensional shapes 42, 52, 62, 72 in front of light sources 44, 54, 64, 74. As seen in FIG. 5a, the scattering member 40 is arranged in a cone shape 42. As seen in FIG. 5b, the scattering member 50 is arranged in a box shape 52. The scattering member may also have a curved shape. As seen in FIG. 5c, the scattering member 60 is arranged in a tunnel or part-cylindrical shape 62. As seen in FIG. 5d, the scattering member 70 is arranged in a dome shape 72.

The person skilled in the art realizes that the present invention by no means is limited to the preferred embodiments described above. On the contrary, many modifications and variations are possible within the scope of the appended claims. For example, the scattering member may be arranged in any three-dimensional shape in front of a light source in a light-emitting arrangement according to the invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A light-emitting arrangement comprising
a light source, and
a scattering member arranged in a three-dimensional shape in front of the light source in a light output direction, wherein different regions of the scattering member have different optical characteristics, wherein the different optical characteristics of the different regions of the scattering member are different geometrical optical structures, and wherein the scattering member is a scattering sheet that is bent or folded into a three-dimensional shape.

2. A light-emitting arrangement according to claim 1, wherein a surface of the scattering member comprises at least one optical structure selected from among the group of ripple structure, refractive structure, lens array structure, and combinations thereof.

3. A light-emitting arrangement according to claim 1, wherein two opposite facing surfaces of the scattering member each comprises an optical structure selected from among the group of ripple structure, refractive structure, lens array structure, and combinations thereof.

4. A light-emitting arrangement according to claim 2, wherein the refractive structure includes total internal refraction facets.

5. A light-emitting arrangement according to claim 2, wherein the optical characteristics of each different region of the scattering member is selected depending on an angle between a direction perpendicular to a surface of each region and a direction from the same region towards the light source.

6. A light-emitting arrangement according to claim 1, wherein the optical characteristics of different regions of the scattering member are selected depending on the relative distances of said respective regions of the scattering member to the light source.

7. A light-emitting arrangement according to claim 1, wherein the optical structures has a depth of about 5-50 μm.

8. A light-emitting arrangement according to claim 7, wherein the scattering sheet comprises a top surface and a bottom surface provided with different regions having different optical characteristics.

9. A light-emitting arrangement according to claim 1, wherein the scattering member is arranged in a three-dimensional shape such that the light from the light source is redirected into at least two different directions by the scattering member.

10. Method for manufacturing a light-emitting arrangement, comprising the steps of:
manufacturing a scattering sheet, wherein different regions of the scattering sheet have different optical characteristics, providing the scattering sheet with different geometrical optical structures in different regions of the scattering sheet wherein the scattering sheet that is bent or folded into a three-dimensional shape; and
arranging the scattering sheet in a three-dimensional shape in front of a light source in a light output direction.

11. A luminaire comprising a light-emitting arrangement according to claim 1.

* * * * *